United States Patent
Browne et al.

(10) Patent No.: US 7,818,309 B2
(45) Date of Patent: Oct. 19, 2010

(54) METHOD FOR MANAGING DATA ACCESS REQUESTS UTILIZING STORAGE META DATA PROCESSING

(75) Inventors: Michael E. Browne, Staatsburg, NY (US); Glenn R. Wightwick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/854,002

(22) Filed: Sep. 12, 2007

(65) Prior Publication Data
US 2007/0299809 A1    Dec. 27, 2007

Related U.S. Application Data

(63) Continuation of application No. 10/749,879, filed on Dec. 31, 2003, now abandoned.

(51) Int. Cl.
*G06F 17/30* (2006.01)
*G06F 7/00* (2006.01)

(52) U.S. Cl. .................. 707/705; 707/783
(58) Field of Classification Search .......... 707/1, 707/705, 706, 707, 781, 783; 709/219; 712/237, 712/238, 220
See application file for complete search history.

(56) References Cited

U.S. PATENT DOCUMENTS

| | | | |
|---|---|---|---|
| 5,761,678 A | 6/1998 | Bendert et al. | |
| 5,819,296 A | 10/1998 | Anderson et al. | |
| 5,832,515 A | 11/1998 | Ledain et al. | |
| 5,852,724 A | 12/1998 | Glenn, II et al. | |
| 5,872,931 A | 2/1999 | Chivaluri | |
| 5,944,782 A | 8/1999 | Noble et al. | |

(Continued)

FOREIGN PATENT DOCUMENTS

JP    7073085 A    3/1995

OTHER PUBLICATIONS

G.H. Kuenning, "The Design of the SEER Predictive Caching System", Mobile Computing Systems and Applications, pp. 37-43 (1994).

(Continued)

*Primary Examiner*—Don Wong
*Assistant Examiner*—Angela M Lie
(74) *Attorney, Agent, or Firm*—John E. Campbell; Kevin P. Radigan, Esq.; Heslin Rothenberg Farley & Mesiti P.C.

(57) ABSTRACT

A method and system are provided for managing requests to access data in a computer environment. In one aspect of the present invention, a request manager receives a request associated with meta data corresponding to data that is maintained separately from the meta data. In another aspect, the request manager informs a data object manager of an anticipated request that will be received by the data object manager to enable it to prepare for the anticipated request. The data object manager commences preparing for the anticipated request in response to being informed of the anticipated request to facilitate a reduction in data access time. In one example of a computing environment utilizing one or more aspects of the invention, a storage subsystem comprising a data object manager prepares for the anticipated request by pre-fetching data blocks from storage media into a cache.

20 Claims, 6 Drawing Sheets

U.S. PATENT DOCUMENTS

| | | | |
|---|---|---|---|
| 5,996,054 | A | 11/1999 | Ledain et al. |
| 6,021,408 | A | 2/2000 | Ledain et al. |
| 6,044,373 | A | 3/2000 | Gladney et al. |
| 6,119,222 | A * | 9/2000 | Shiell et al. ............... 712/238 |
| 6,145,012 | A | 11/2000 | Small |
| 6,163,773 | A | 12/2000 | Kishi |
| 6,256,645 | B1 | 7/2001 | Mundy |
| 6,282,710 | B1 | 8/2001 | Boehlet |
| 6,381,602 | B1 | 4/2002 | Shoroff et al. |
| 6,389,420 | B1 | 5/2002 | Vahalia et al. |
| 6,401,193 | B1 | 6/2002 | Afsar et al. |
| 6,487,644 | B1 | 11/2002 | Huebsch et al. |
| 6,502,174 | B1 | 12/2002 | Beardsley et al. |
| 6,654,766 | B1 | 11/2003 | Degenaro et al. |
| 6,952,737 | B1 | 10/2005 | Coates et al. |
| 2002/0078239 | A1 | 6/2002 | Howard et al. |
| 2003/0005219 | A1 | 1/2003 | Royer, Jr. et al. |
| 2003/0187860 | A1 | 10/2003 | Holland |
| 2003/0200202 | A1 * | 10/2003 | Hsiao et al. ............... 707/3 |
| 2003/0220984 | A1 * | 11/2003 | Jones et al. ............... 709/219 |
| 2006/0277186 | A1 * | 12/2006 | Moreshet et al. ............ 707/9 |

OTHER PUBLICATIONS

Ibrahim et al., "Neural Nets Based Predictive Prefetching to Tolerate WWW Latency", Distributed Computing Systems, pp. 636-643 (2000).

Cohen et al., "Efficient Algorithms for Predicting Requests to Web Servers", INFOCOM '99, Eighteenth Annual Joint Conference of the IEEE Computer and Communications Societies, IEEE Proceedings, pp. 284-293 (Mar. 1999).

"VxFS Caching Advisories", UNIX Filesystems—Evolution, Design and Implementation, pp. 43-46.

* cited by examiner

US 7,818,309 B2

METHOD FOR MANAGING DATA ACCESS REQUESTS UTILIZING STORAGE META DATA PROCESSING

CROSS-REFERENCE TO RELATED APPLICATION

This application is a continuation of co-pending U.S. patent application Ser. No. 10/749,879, filed Dec. 31, 2003, and published Jul. 7, 2005 as U.S. Patent Publication No. US/2005-0149562 A1, entitled "System and Program Storage Device for Managing Data Access Requests Utilizing Storage Meta Data Processing" (As Amended), by Browne et al., the entirety of which is hereby incorporated herein by reference.

TECHNICAL FIELD

This invention relates, in general, to the management of requests to access data in communications environments, and more particularly, to informing a data object manager of an anticipated request to access the data from storage media based on a received request associated with meta data which corresponds to the data.

BACKGROUND OF THE INVENTION

Storage subsystems generally consist of a number of disk drives that can be aggregated and made to appear as virtual disk drives to one or more client computers. To improve performance, storage subsystems usually deploy a cache which is used to hold frequently accessed disk blocks. The choice of which disk blocks to cache can have a significant impact on overall system performance. Some storage subsystems attempt to anticipate which disk blocks may be required by client computers by examining historical patterns of access to disk blocks. The nature of such cache management algorithms is predictive.

Although there are techniques today for the management of requests to access data in communications environments, these techniques can cause a storage subsystem to load data into its cache that is not accessed within the expected time because of their predictive nature. Thus, there is still a need for further techniques to facilitate the management of requests to access data in computer environments.

SUMMARY OF THE INVENTION

The shortcomings of the prior art are overcome and additional advantages are provided through the provision of a method of managing requests. In one aspect, a manager receives a request associated with meta data corresponding to data maintained separately from the meta data. In another aspect of the present invention, the manager informs another manager of an anticipated request that will be received by the another manager to enable it to prepare for the anticipated request.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In one aspect of the present invention, a manager receives a request associated with meta data. The manager informs another manager of an anticipated request to be received the another manager to enable the another manager to prepare for the anticipated request.

Figure 1:
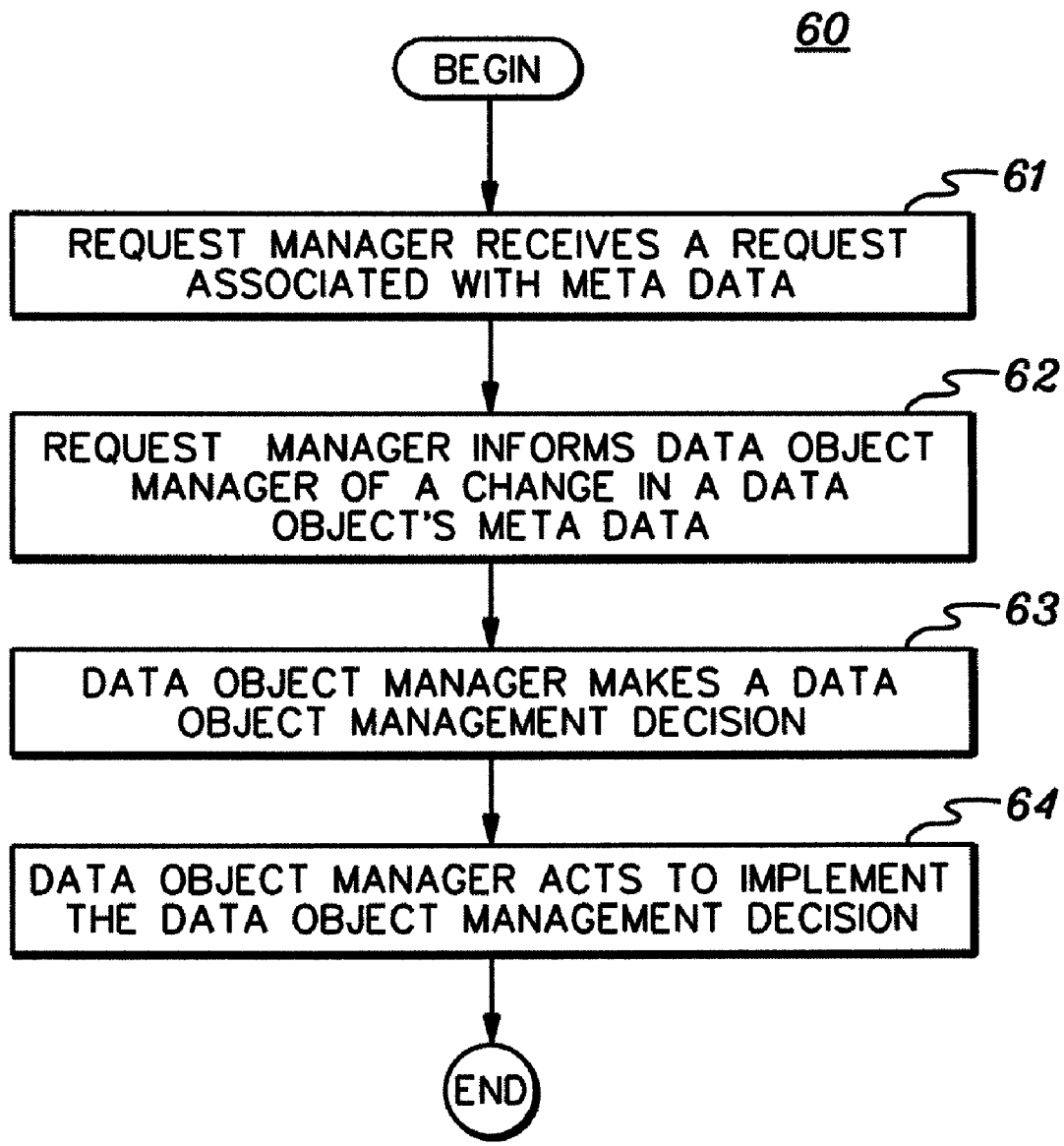
FIG. 1 illustrates a flowchart of one embodiment of a technique for managing requests associated with data in a computer environment, in accordance with an aspect of the present invention.

A technique for managing requests associated with data in a computer environment in accordance with an aspect of the present invention is described below with reference to request management flowchart 60 illustrated in FIG. 1. First, step 61 comprises a request manager receiving a request associated with meta data. Then, in step 62, the request manager informs a data object manager of a change in a data object's meta data. The data object manager makes a data object management decision in step 63 and, if necessary, acts to implement the data object management decision in step 64.

Figure 2:
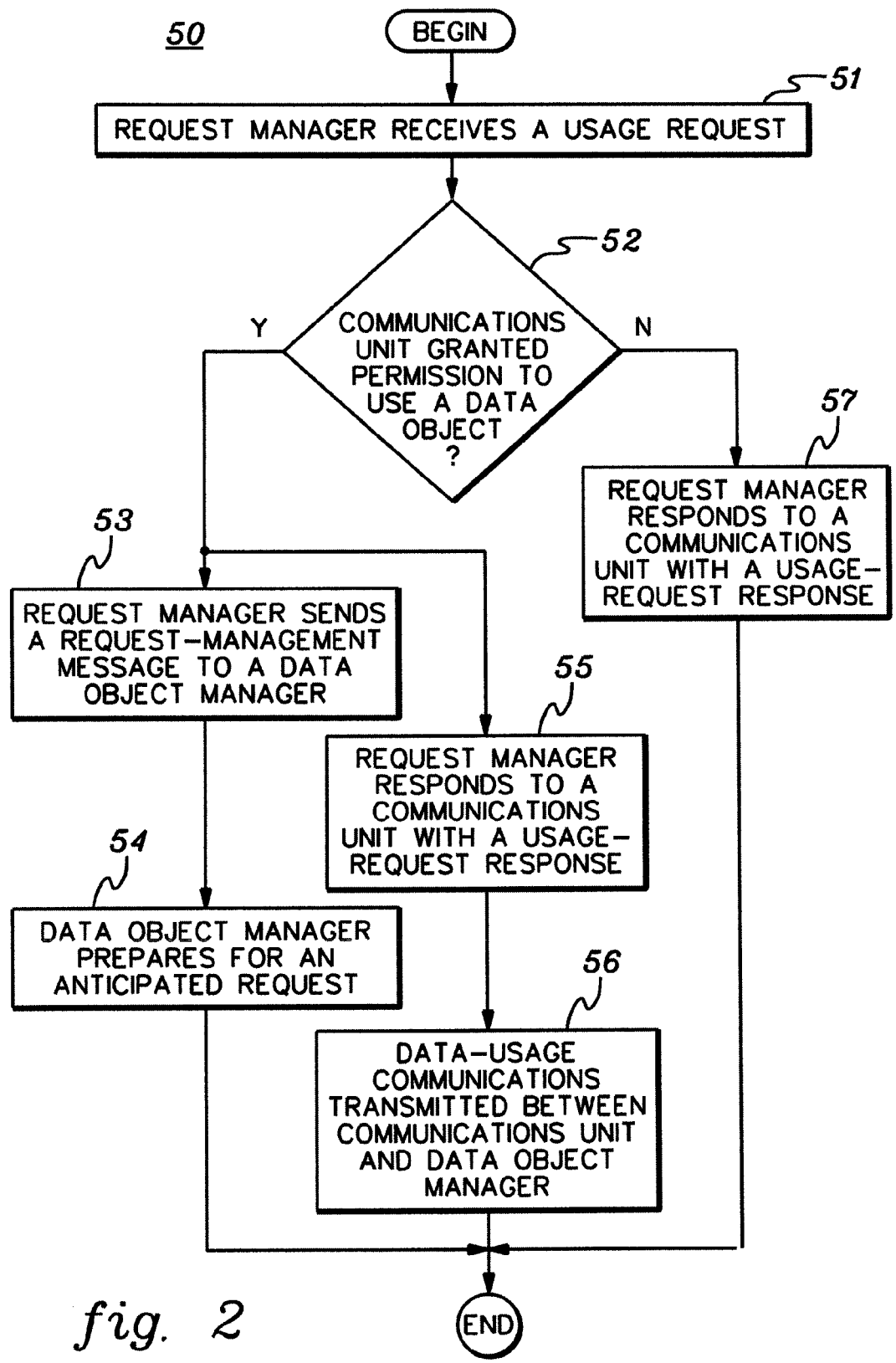
FIG. 2 illustrates a flowchart of another embodiment of a technique for managing requests associated with data in a computer environment, in accordance with an aspect of the present invention.

Further aspects of a technique for managing requests associated with data objects in a computer environment in accordance with the present invention are described below with reference to flowchart 50 illustrated in FIG. 2. First, step 51 comprises a request manager receiving a usage request. Then, if the communications unit is granted permission to use a data object as determined in step 52, a request manager sends a request-management message to a data object manager and responds, substantially simultaneously, to a communications unit with a usage-request response in steps 53 and 55, respectively. Subsequent to steps 53 and 55, respectively, the data object manager prepares for an anticipated request in step 54, and data-usage communications are transmitted between the communications unit and data object manager in step 56. In one example, the step of transmitting data-usage communications includes transmitting by a communications unit requests for data blocks and transmitting by a data object manager data comprising the requested data blocks of the data object. Alternatively, if the communications unit is not granted permission to use a data object, step 57 comprises the request manager responding to a communications unit with a usage-request response.

One example of a communications environment in which a technique for managing requests associated with data objects is utilized in accordance with an aspect of the present invention is described below with reference to FIG. 3. In an environment in which the meta data associated with data objects may be stored separately from the data objects, a request manager 10 receives usage requests from a communications unit 20 via request management network 12. Request manager 10 transmits a request-management message to a data object manager 30 via a private network 14 and responds to communications unit 20 with a usage-request response via request management network 12. If communications unit 20 is granted permission to use a data object 40, the communications to support use of data object 40 are transmitted via data network 16 between communications unit 20 and data object manager 30.

Generally, both meta data and user data are associated with data objects in a computer communications environment. User data is the information that has meaning to a user or to a program that may process that data. Examples of user data are the contents of a Freelance Graphics® presentation, or employee information stored within a relational database. Meta data is information about user data. Examples of meta data associated with data objects include the identity of client computers that have access permission, data object type, names of files associated with a set of disk blocks, the length of a file, the list of blocks that constitute a file, information about user access permissions, and the date and time a file has been created or updated. Data objects comprise data. Data object types include data files, checkpoint files, file systems, logical volumes, and journaled file system (JFS) logical volume logs.

Figure 3:
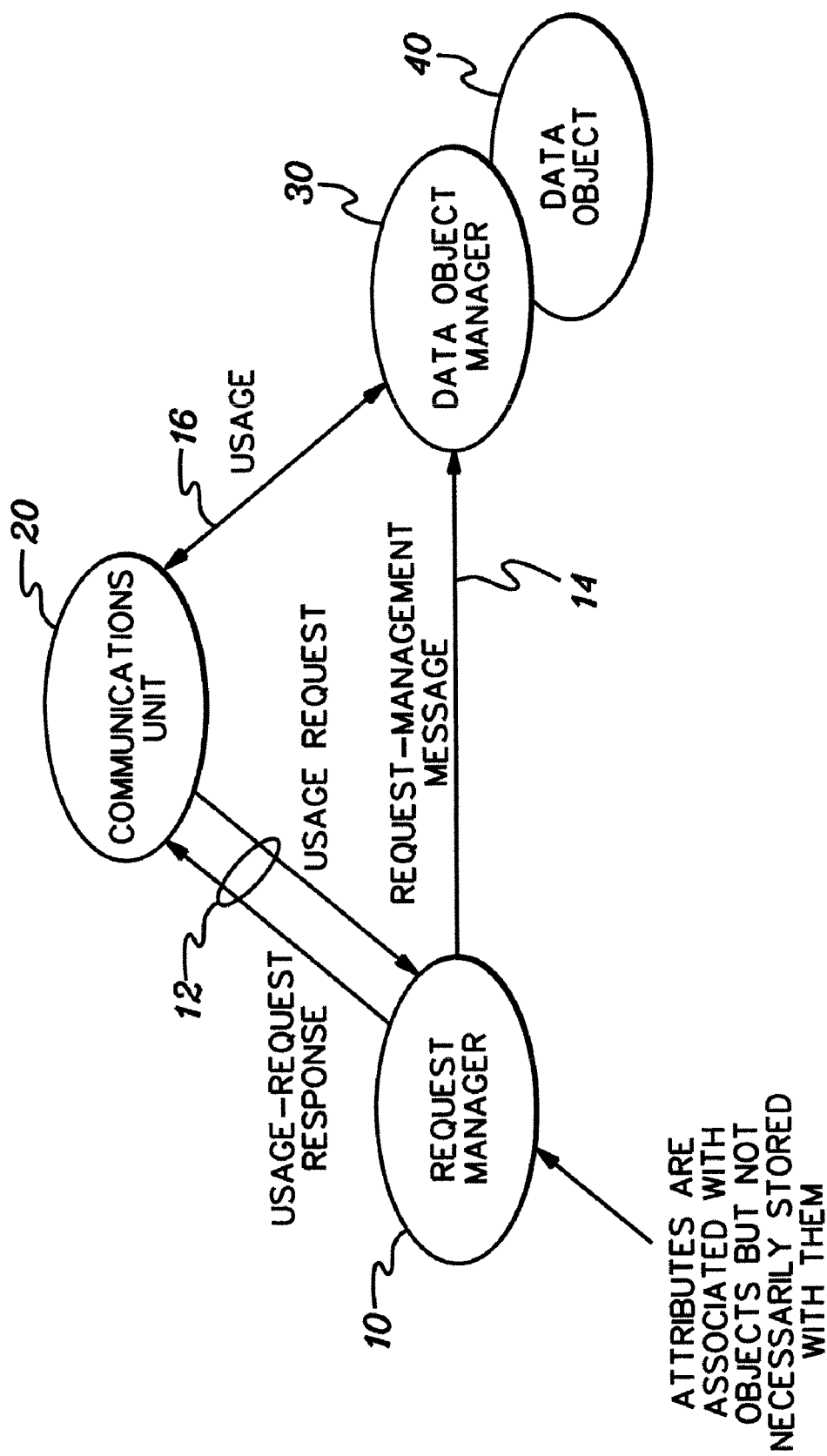
FIG. 3 illustrates one embodiment of a technique for managing requests for access to data in an environment in which data and meta data associated with the data are stored separately, in accordance with an aspect of the present invention.

Features facilitated by use of the technique in the computer environment illustrated in FIG. 3 include: improved security with respect to access to data objects, regulation of the speed of access to data objects, arbitration of access priorities to data objects, and increased speed of access to data objects.

An emerging class of storage environments separates the storage of user data and meta data and provides separate networks over which the user data and meta data traverse. An example of such a storage environment is IBM's Storage Tank™ file system wherein a Storage Tank™ client (a computer) accesses user data from a storage subsystem (over a storage area network (SAN) using block transfer protocols) and accesses meta data from a centralized Storage Tank™ meta data controller (over Ethernet using TCP/IP protocols). The separation of user data and meta data can be either logical or physical. Storage subsystems, which generally comprise a number of disk drives that can be aggregated and made to appear as virtual disk drives to one or more client computers, usually deploy a cache, which is used to hold frequently accessed disk blocks, to improve input-output performance.

One or more aspects of the present invention take advantage of the fact that where user data and meta data are separated, the processing of meta data in conjunction with file access provides additional information which can be used to inform a storage subsystem of future input/output (I/O) access requests. This information can be utilized by a storage subsystem to facilitate the management of its internal caches.

An example of the management of the contents of a cache in a data storage subsystem which utilizes information obtained by processing file meta data in accordance with an aspect of the present invention is described as follows with reference to FIG. 4. When a client computer 210 wants to read and update some disk blocks associated with a file located in a storage subsystem 230, client computer 210 must be granted an exclusive lock on the associated disk blocks. Client computer 210 initiates a transaction to meta data controller 220, requesting the lock. This lock request indicates that client computer 210 intends to perform I/O operations on a certain range of disk blocks in the future. If meta data controller 220 can grant the requested lock, meta data controller 220 passes a "hint" to storage subsystem 230, which stores those blocks, indicating that the storage subsystem can expect to receive an I/O request from a client computer for a particular range of disk blocks. Meta data controller (MDC) 220 communicates this "hint" to storage subsystem 230 via private network 222. Essentially concurrently, meta data controller 220 grants the lock by signaling to client computer 210 via meta data network 212. In this exemplary embodiment, MDC 220 is an example of a request manager, and storage subsystem controller 236 of storage subsystem 230 is an example of a data object manager.

If storage subsystem 230 determines that the requested disk blocks are not in cache 232, it pre-fetches the requested blocks from storage disks 234 into cache 232. After receiving the requested lock, client computer 210 initiates an I/O operation with storage subsystem 230 via data network 214 to access at least some of the disk blocks on which a lock was received. When the client-initiated I/O request is received by storage subsystem 230, the storage subsystem may have the requested disk blocks in its cache already as a result of pre-fetching. If not, storage subsystem 230 has already commenced the necessary physical I/O to load the requested blocks into cache 232 as a result of previously receiving a hint from meta data controller 220. When the requested disk blocks are available in cache 232, they are sent to client computer 210 from cache 232 via data network 214. The result of storage subsystem 230 initiating disk input/output in order to store disk blocks that are subject to a future access request by a client computer in cache 232 in advance of receiving a request from client computer 210 is that data access latency is reduced.

Figure 4:
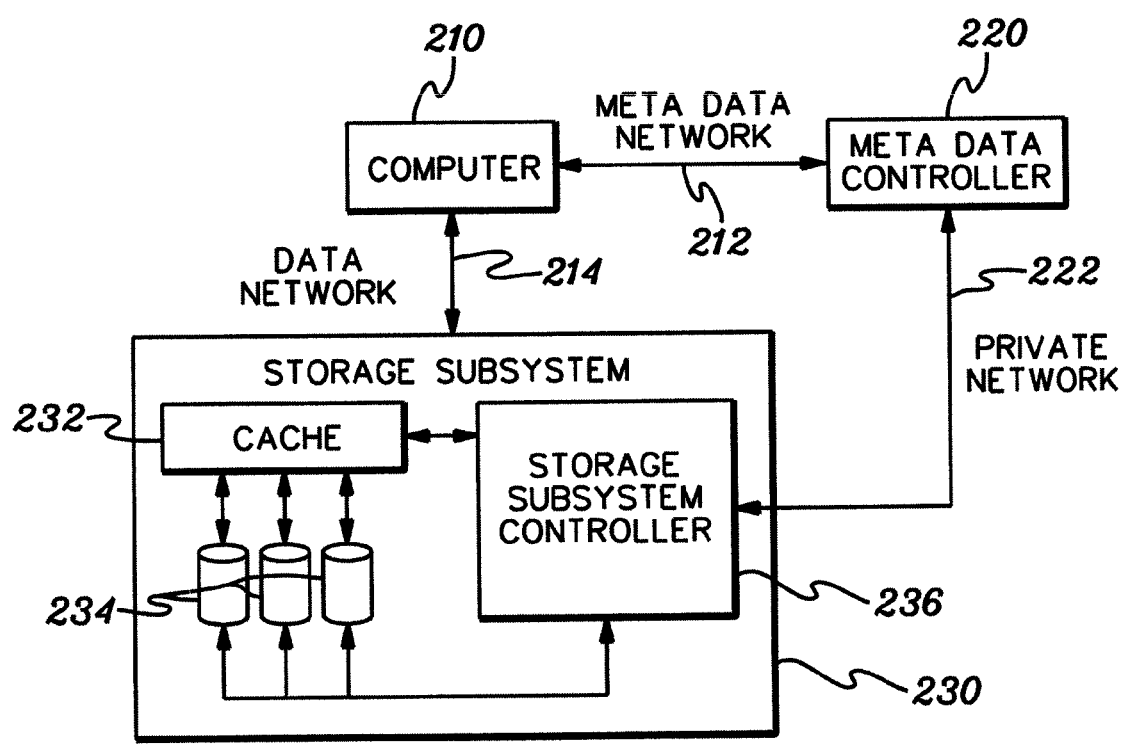
FIG. 4 illustrates an example of an environment in which a technique for managing requests for access to data is utilized, in accordance with an aspect of the present invention.

The method of the present invention is also utilized in the operation of the example illustrated in FIG. 4 when a client computer writes disk blocks to the storage subsystem. If client computer 210 sends a transaction to MDC 220, indicating that the client computer has closed a file and has finished writing blocks to the storage subsystem, meta data controller 220 communicates this information to storage subsystem 230 via private network 222. Storage subsystem 230 determines whether to free the storage locations in cache 232 in which the disk blocks comprising the closed file are stored based on this file-closed message and possibly "hints" received regarding other future data access requests. Freeing storage locations in cache 232 permits storage of other disk blocks in cache for expedited access.

Another example of managing the contents of a cache in a data storage subsystem which utilizes information obtained by processing file meta data in accordance with an aspect of the present invention relates to a computer writing a large file which is not likely to be read. An example of such a file is a checkpoint/restart file, created by a long-running computational job, or a database log file. These files are typically used to recover the state of a computational workload after a computer crash. Since computer crashes are very rare, checkpoint/restart files are typically written regularly, but rarely read. Knowledge of this information can be used to inform a storage subsystem not to cache a checkpoint/restart file once it has been written to disk.

This example is described further with reference to the exemplary environment of FIG. 4. When computer 210 wishes to write a checkpoint/restart file, it requests write permission from meta data controller 220 via the meta data network 212 and informs meta data controller 220 that the file should not be actively cached. Alternatively, meta data controller 220 could automatically recognize that the file is of a particular type (such as a checkpoint/restart file). Meta data controller 220 grants permission to computer 210 to write the file, providing a list of blocks where the file should be written, and simultaneously, via private network 222, informs storage controller 236 of storage subsystem 230 that computer 210 is about to write a large file that should not be actively cached in storage subsystem cache 232.

When computer 210 writes the file via data network 214 to storage subsystem 230, storage subsystem controller 236 decides how much of cache 232 to allocate to storing all or part of the large file and, as quickly as possible, writes the contents of the large file to storage disks 234 within the storage subsystem. As soon as the contents (or partial contents) of the file are written to storage disks 234 of the storage subsystem, the associated file data within the cache 232 can be discarded immediately, since it is highly unlikely that this file will need to be read again. Thus, utilization of the cache based on knowledge of the type of data being stored, which is gained through processing the file's meta data, facilitates optimization of the use of the cache resource.

An example related to the previous example involves a computer reading a checkpoint/restart file described above to recover the state of a computational workload after the computer has crashed. Knowledge that this type of file is rarely read can be used to inform the storage subsystem to not cache the file when it is being read from disk. It should be noted that the management of the contents of a cache in a data storage subsystem described below with respect to this example applies to reading any large file which is only likely to be accessed infrequently.

With reference to FIG. 4, computer 210 intends to read a checkpoint/restart file so computer 210 requests permission from meta data controller 220 via meta data network 212 to read the file and informs meta data controller 220 that the file should not be actively cached. Alternatively, meta data controller 220 automatically recognizes that the file is of a particular type (such as a checkpoint/restart file), rather than having to be informed by computer 210. Meta data controller 220 grants permission to computer 210 to read the file, providing a list of blocks where the file is located, and simultaneously, via the private network 222, informs storage subsystem controller 236 of storage subsystem 230 that computer 210 is about to read a large file that should not be actively cached in the storage subsystem cache 232. When computer 210 reads the file via data network 214 from storage subsystem 230, storage subsystem controller 236 decides how much of cache 232 to allocate to reading the file from storage disks 234. As soon as the contents (or partial contents) of the file are transmitted to computer 210, the associated file data within the cache 232 can be discarded immediately, since it is highly unlikely that this file will need to be read again. Thus, utilization of the cache based on the type of data being accessed, which is determined by processing the file's meta data, frees cache resources to facilitate faster access to other files.

Figure 5:
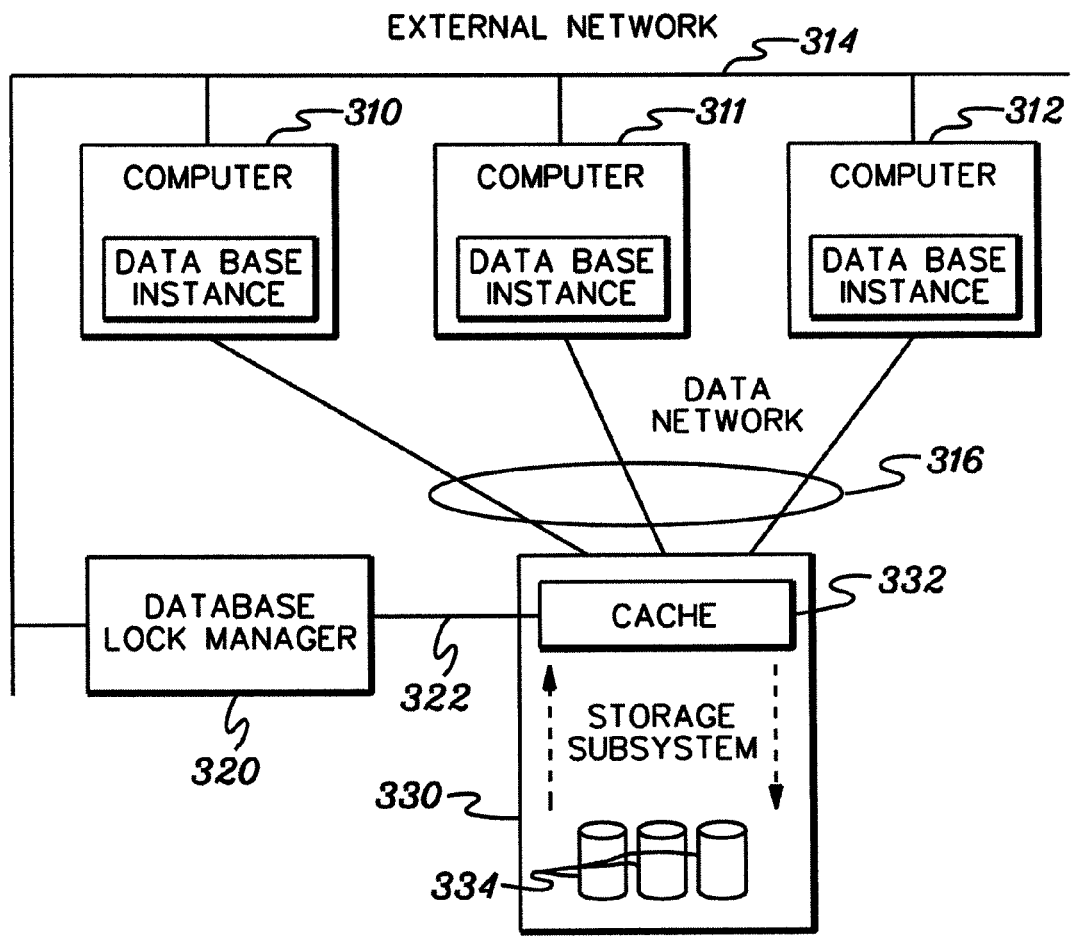
FIG. 5 illustrates another example of an environment in which a technique for managing requests for access to data is utilized, in accordance with an aspect of the present invention.

Another example of an environment using a technique for managing requests for access to data objects to effectuate management of the contents of a cache in a data storage subsystem by utilizing information obtained from processing file meta data in accordance with an aspect of the present invention is described below with reference to FIG. 5. In this example, a number of computers (310, 311, and 312) are members of a database cluster. Each of computers 310, 311, and 312 hosts an instance of the cluster's database. When a computer 310 wants to read and update some disk blocks associated with a database table located in a storage subsystem 330, computer 310 must be granted an exclusive lock on the associated disk blocks. Computer 310 requests a lock on those disk blocks from database lock manager 320 by sending a request on external network 314. If database lock manager 320 can grant the requested lock, database lock manager 320 grants the lock via a message sent to computer 310 on external network 314 and essentially simultaneously sends a message to storage subsystem 330, indicating that the storage subsystem can expect to receive an I/O request from a client computer for a particular range of disk blocks. Database lock manager 320 communicates this message to storage subsystem 330 via private network 322. Analogously to the previous example, database lock manager 320 is an example of a request manager, and storage subsystem 330 comprises a data object manager.

If storage subsystem 330 determines that the disk blocks for which a lock was granted are not in cache 332, storage subsystem 330 initiates an I/O operation to storage disks 334. Computer 310 initiates an I/O operation with storage subsystem 330 since it has been granted a lock on the requested disk blocks. When the I/O request initiated by computer 310 is received by storage subsystem 330 via data network 316, the storage subsystem may have already pre-fetched the requested disk blocks and stored them in cache 332. Even if all requested disk blocks have not yet been loaded in the cache, the storage subsystem has initiated the physical I/O from storage disks 334 prior to receiving the request from computer 310. As a result, the latency in providing the requested disk blocks from cache 332 is less than it would be without pre-fetching prompted by the "hint" from the database lock manager.

Figure 6:
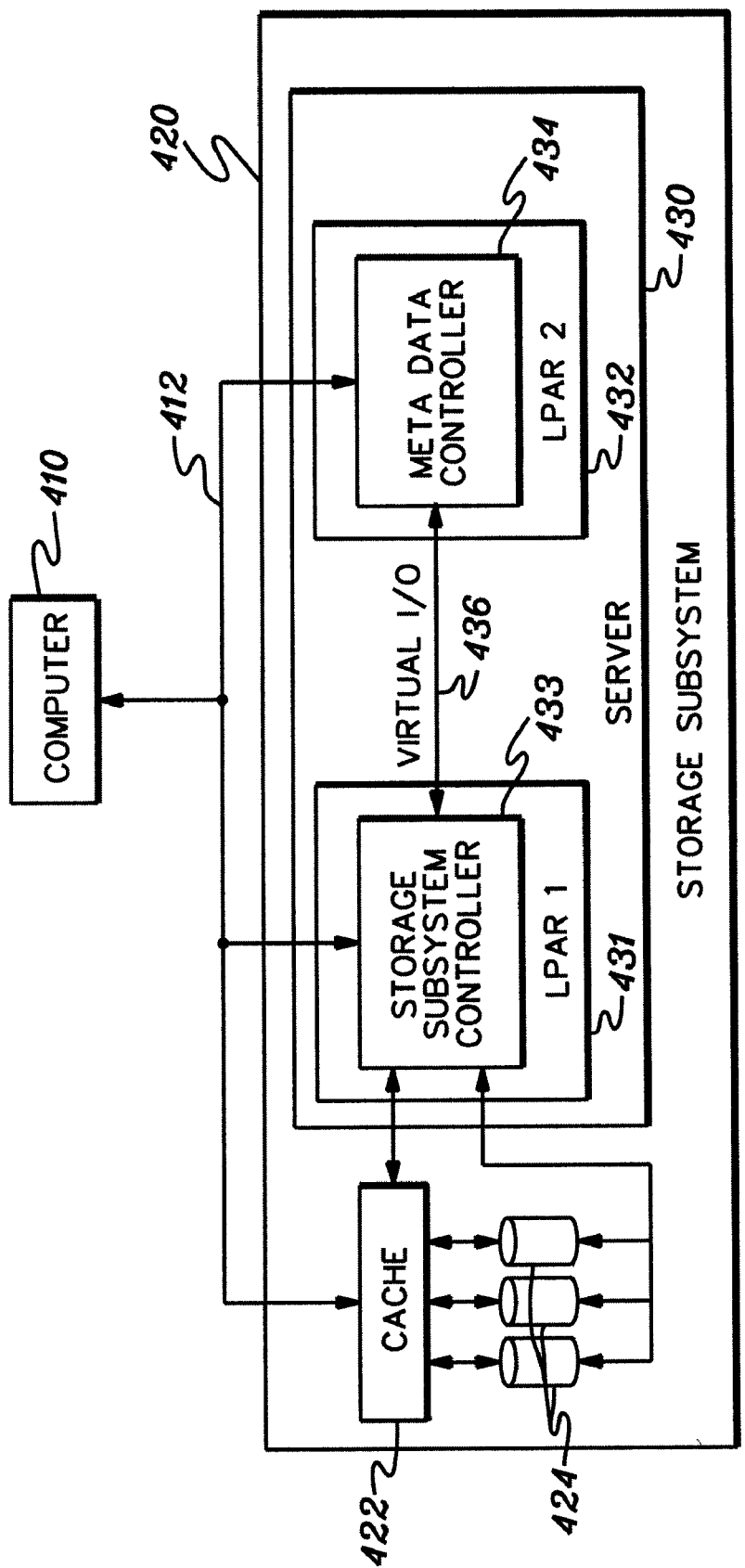
FIG. 6 illustrates a third example of an environment in which a technique for managing requests for access to data is utilized, in accordance with an aspect of the present invention.

In another example of a computer environment embodying the present invention, which is described with reference to FIG. 6, a centralized storage meta data controller 434 is co-hosted with a storage subsystem 420. In this environment, one or more computers are connected to the data storage subsystem via a data network. By way of example, as shown in FIG. 6, a computer 410 exchanges data with a storage subsystem 420 via data network 412. Storage subsystem 420 comprises a server 430 connected to a cache 322 and storage disks 424. Server 430 comprises logical partitions 431 and 432.

In this example, the functions of meta data controller 434 and storage subsystem controller 433 are executed by software running in logical partitions (LPARs) 432 and 431, respectively, of server 430. Using virtual input/output bus 436 between the meta data controller LPAR 432 and the storage subsystem controller LPAR 431, "hints" regarding anticipated future I/O requests directed to storage subsystem 420 are passed at very high speed and low latency from meta data controller 434 to storage subsystem controller 433. The benefit of pre-fetching disk blocks into the storage subsystem cache is enhanced by the use of high-speed, low-latency communications between the meta data controller and storage subsystem controller. In this example, meta data controller 434 and storage subsystem controller 433 are examples of a request manager and a data object manager, respectively.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing requests in a computer environment, said method comprising:

providing a computer environment, comprising a data storage subsystem, with functionality for:

receiving by a request manager of the computer environment, via a request management network, an access permission request from a requester, the access permission request associated with meta data, said meta data corresponding to data maintained separately from the meta data by a data object manager of the data storage subsystem of the computer environment, the request manager determining, responsive to receipt of the access permission request, whether to grant the requester subsequent access to the data through the data object manager, and generating an access permission request response to be sent to the requester across the request management network responsive to the determining by the request manager;

responsive to determining to grant the requester access to the data in response to the access permission request, automatically informing by the request manager, via a private network, the data object manager of a data request to be subsequently received by the data object manager from the requester via a data network in response to granting of the access permission request, to enable the data object manager to prepare for the data request, wherein the data request to be subsequently received by the data object manager is at least partially ascertainable from the meta data associated with the access permission request received by the request manager; and wherein the data object manager prepares for the data request to be received across the data network by adjusting utilization of a cache of the data storage subsystem of the computer environment based on information derived from the meta data associated with the access permission request by the request manager before the data request is received at the data object manager from the requester.

2. The method of claim 1, wherein the data object manager prepares for the data request by at least one of pre-fetching into the cache data required by the data request, thereby reducing data access latency, or moving data from the cache to a disk of the data storage subsystem, thereby facilitating receipt of data at the cache.

3. The method of claim 1, wherein said preparing comprises managing contents of the cache in the data storage subsystem, wherein the data object manager prepares for the data request by noting that data associated with the data request is not to be cached.

4. The method of claim 1, wherein the data object manager prepares for the data request by managing the requester's access to the data.

5. The method of claim 1, further comprising:

sending, by the request manager, the access permission request response to the requester in response to the access permission request substantially simultaneously with said informing; and thereafter receiving, by the data object manager, the data request from the requester, wherein said preparing by the data object manager begins before the receiving by the data object manager.

6. The method of claim 2, wherein said pre-fetching comprises pre-fetching one or more data blocks from one or more storage media of the data storage subsystem whereby the data blocks are stored in the cache, the data blocks comprising at least some of the data.

7. The method of claim 1, wherein the preparing by the data object manager comprises releasing storage locations of the cache, whereby the storage locations become available for storing other data.

8. The method of claim 1, wherein the request manager automatically informs, via the private network, the data object manager of the data request substantially concurrently with sending, via the request management network, the access permission request response to the requester.

9. The method of claim 1, wherein the private network is a distinct, external, communications network between the request manager and the data object manager, separate from the request management network and the data network.

10. A computer program product for managing requests in a computer environment, the computer program product comprising:

a storage medium readable by a processing circuit and storing instructions for execution by the processing circuit for performing a method comprising:

receiving by a request manager of the computer environment, via a request management network, an access permission request from a requester, the access permission request associated with meta data, said meta data corresponding to data maintained separately from the meta data by a data object manager of the data storage subsystem of the computer environment, the request manager determining, responsive to receipt of the access permission request, whether to grant the requester subsequent access to the data through the data object manager, and generating an access permission request response to be sent to the requester across the request management network responsive to the determining by the request manager;

responsive to determining to grant the requester access to the data in response to the access permission request, automatically informing by the request manager, via a private network, the data object manager of a data request to be subsequently received by the data object manager from the requester via a data network in response to granting of the access permission request, to enable the data object manager to prepare for the data request, wherein the data request to be subsequently received by the data object manager is at least partially ascertainable from the meta data associated with the access permission request received by the request manager; and wherein the data object manager prepares for the data request to be received across the data network by adjusting utilization of a cache of the data storage subsystem of the computer environment based on information derived from the meta data associated with the access permission request by the request manager before the data request is received at the data object manager from the requester.

11. The computer program product of claim 10, wherein the data object manager prepares for the data request by at least one of pre-fetching into the cache data required by the data request, thereby reducing data access latency, or moving data from the cache to a disk of the data storage subsystem, thereby facilitating receipt of data at the cache.

12. The computer program product of claim 10, wherein said preparing comprises managing contents of the cache in the data storage subsystem, wherein the data object manager prepares for the data request by noting that data associated with the data request is not to be cached.

13. The computer program product of claim 10, wherein the data object manager prepares for the data request by managing the requester's access to the data.

14. The computer program product of claim 10, further comprising:

sending, by the request manager, the access permission request response to the requester in response to the access permission request substantially simultaneously with said informing; and thereafter receiving, by the data object manager, the data request from the requester, wherein said preparing by the data object manager begins before the receiving by the data object manager.

15. The computer program product of claim 10, wherein the request manager automatically informs, via the private network, the data object manager of the data request substantially concurrently with sending, via the request management network, the access permission request response to the requester.

16. The computer program product of claim 10, wherein the private network is a distinct, external communications network between the request manager and the data object manager, separate from the request management network and the data network.

17. A computer system for managing requests in a computer environment, the computer system comprising:

a memory; and a processor in communications with the memory, wherein the computer system is configured to perform a method, the method comprising:

receiving by a request manager of the computer environment, via a request management network, an access permission request from a requester, the access permission request associated with meta data, said meta data corresponding to data maintained separately from the meta data by a data object manager of a data storage subsystem of the computer environment, the request manager determining, responsive to receipt of the access permission request, whether to grant the requester subsequent access to the data through the data object manager, and generating an access permission request response to be sent to the requester across the request management network responsive to the determining by the request manager;

responsive to determining to grant the requester access to the data in response to the access permission request, automatically informing by the request manager, via a private network, the data object manager of a data request to be subsequently received by the data object manager from the requester via a data network in response to the access permission request, to enable the data object manager to prepare for the data request, wherein the data request to be subsequently received by the data object manager is at least partially ascertainable from the meta data associated with the access permission request received by the request manager; and wherein the data object manager prepares for the data request to be received across the data network by adjusting utilization of a cache of the data storage subsystem of the computer environment based on information derived from the meta data associated with the access permission request by the request manager before the data request is received at the data object manager from the requester.

18. The computer system of claim 17, wherein the data object manager prepares for the data request by at least one of pre-fetching into the cache data required by the data request, thereby reducing data access latency, or moving data from the cache to a disk of the data storage subsystem, thereby facilitating receipt of data at the cache.

19. The computer system of claim 17, wherein said preparing comprises managing contents of the cache in the data storage subsystem, wherein the data object manager prepares for the data request by noting that data associated with the data request is not to be cached.

20. The computer system of claim 17, wherein the request manager automatically informs, via the private network, the data object manager of the data request substantially concurrently with sending, via the request management network, the access permission request response to the requester.

* * * * *